United States Patent
Eglit et al.

[11] Patent Number: 6,115,507
[45] Date of Patent: *Sep. 5, 2000

[54] METHOD AND APPARATUS FOR UPSCALING VIDEO IMAGES IN A GRAPHICS CONTROLLER CHIP

[75] Inventors: Alexander Julian Eglit, San Carlos; Jim Zong, Fremont, both of Calif.

[73] Assignee: S3 Incorporated, Santa Clara, Calif.

[*] Notice: This patent is subject to a terminal disclaimer.

[21] Appl. No.: 09/076,670

[22] Filed: May 12, 1998

Related U.S. Application Data

[63] Continuation of application No. 08/536,315, Sep. 29, 1995, Pat. No. 5,768,507.

[51] Int. Cl.[7] ....................................................... G06K 9/32
[52] U.S. Cl. ........................... 382/300; 345/519; 382/238
[58] Field of Search ................................. 382/236, 238, 382/300, 232; 358/261.2, 428, 430, 525; 348/394, 409, 410, 411; 341/143; 345/130, 519

[56] References Cited

U.S. PATENT DOCUMENTS

| | | | |
|---|---|---|---|
| 3,824,590 | 7/1974 | Limb | 348/409 |
| 3,927,372 | 12/1975 | Zschunke | 341/143 |
| 4,368,487 | 1/1983 | Sabri | 348/411 |
| 4,691,233 | 9/1987 | Acampora | 348/419 |
| 5,111,293 | 5/1992 | Yamashita | 348/409 |
| 5,124,790 | 6/1992 | Nakayama | 358/261.2 |
| 5,442,718 | 8/1995 | Kobayashi et al. | 382/166 |
| 5,608,864 | 3/1997 | Bindlish et al. | 345/185 |
| 5,611,041 | 3/1997 | Bril et al. | 345/201 |
| 5,768,507 | 6/1998 | Eglit | 395/200.32 |

OTHER PUBLICATIONS

Jones, Principles and Applications of Digital Electronics, 1986, pp. 216–217.

*Primary Examiner*—Amelia Au
*Assistant Examiner*—Timothy M. Johnson
*Attorney, Agent, or Firm*—Fenwick & West LLP

[57] ABSTRACT

A display controller to upscale a source video image for display on a display unit of a computer system. An encoder circuit in the display controller chip stores in a local memory pixel data of previous scan lines required for interpolation in a compressed format using differential pulse code modulation (DPCM) scheme. A decoder circuit decompresses the pixel data into original format prior to sending to an interpolator. The interpolator receives a present scan line and the decompressed data of previous scan lines, and interpolates the received pixels to generate additional pixels required for upscaling the source video image.

28 Claims, 6 Drawing Sheets

METHOD AND APPARATUS FOR UPSCALING VIDEO IMAGES IN A GRAPHICS CONTROLLER CHIP

RELATED APPLICATIONS

This is a continuation of application Ser. No. 08/536,315, now U.S. Pat. No. 5,768,507, filed on Sep. 29, 1995, which is incorporated by reference herein in its entirety.

CROSS REFERENCE TO RELATED APPLICATIONS

The subject matter in this application is related to that in U.S. patent application Ser. No. 08/536,577, now U.S. Pat. No. 5,768,507, entitled "Method and Apparatus for Overcoming a Slope Overload Condition While Using Differential Pulse Code Modulation Scheme" filed concurrently herewith and incorporated herein by reference.

FIELD OF THE INVENTION

The present invention relates generally to computer graphics systems and more specifically to a method and apparatus for upscaling video images using a graphics controller chip.

BACKGROUND OF THE INVENTION

A need frequently arises to upscale video images while displaying these video images on computer systems. For example, a CD-ROM decoder in a computer system may generate a source video image of size 160×120 pixels and the image may need to be displayed on a display area of size 640×480 pixels on a display screen of the computer system. In such a situation where the size of the display image is larger than the size of the source image, the source video image needs to be upscaled to the larger display image while still maintaining the characteristics of the source video image.

Figure 1:
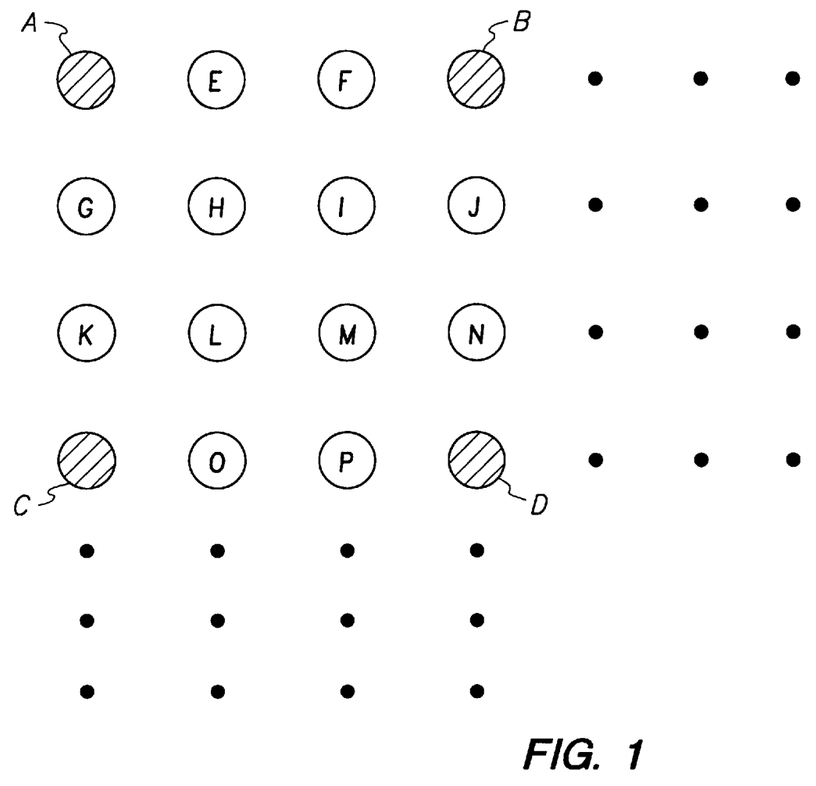
FIG. 1 is a diagram illustrating pixels in a source video image and the additional pixels in a corresponding upscaled image.

Interpolation is a well-known prior art technique used for upscaling video images. In an interpolation scheme, several adjacent pixels in a source video image are typically used to generate additional new pixels. FIG. 1 shows pixels (A, B, C, and D) of the source video image and pixels (E–P) that are additionally generated by interpolation to upscale the source video image. Pixel E may be generated, for example, by formula (⅔ A+⅓ B). If each of the pixels is represented in RGB format, RGB components of pixel E may be generated by using corresponding components of pixels A, B. Pixel K may similarly be generated using the formula (⅓ A+⅔ C). The generation of pixels such as E, F may be termed horizontal interpolation as pixels E, F are generated using pixels A, B located horizontally. Generation of pixels such as G, K may be termed vertical interpolation.

Graphic controller chips in prior art computer systems may use a display memory to store source image data prior to upscaling the source image. Such graphics controller chips may store the pixels in a scan line dominant order, i.e. pixels corresponding to a given scan line may be stored in consecutive locations in display memory prior to storing pixels of a subsequent scan line. Such a scan line dominant order of storing may cause pixels of different scan lines to be stored in different pages of display memory.

During vertical interpolation of source image data, throughput performance problems may be encountered in a scan line dominant order of storing scheme because vertical interpolation usually requires pixels from different scan lines. Accessing different scan lines may require retrieving data from different pages of the display memory forcing a non-aligned or non-page mode read access. A non-page mode read access may require more clock cycles than a page mode access for memory locations within a pre-charged row. Thus the average memory access time during vertical interpolation may be much higher than consecutive memory accesses within the same row. High average memory access time during vertical interpolation may result in a decrease in the overall throughput performance of a graphics controller chip.

To minimize number of accesses across different rows, a graphics controller chip may retrieve and store a previous scan line in a local memory element. For example, with respect to FIG. 1, a graphics controller chip may retrieve and store all pixels corresponding to scan line A-B and store retrieved pixels in a local memory located in the graphics controller chip. The graphics controller chip may then retrieve pixels corresponding to scan line C-D, and interpolate using pixels stored in the local memory.

One problem with such a scheme employing local memory is that a large local memory may be required. For example, to store 720 pixels of a scan line with each pixel being represented in RGB format, and with each of RGB components stored as eight bits, a memory of size 720×3×8=17280 bits may be required. Such a large local memory may increase the cost of graphics controller chips besides requiring additional silicon space.

More over, interpolation schemes which make use of multiple scan lines may require a correspondingly bigger local memory. For example, a more sophisticated interpolation scheme may use more than two scan lines to generate additional pixels for upscaling.

SUMMARY AND OBJECTS OF THE INVENTION

It is therefore an object of the present invention to increase the performance throughput of a graphics controller while upscaling a source video image.

It is another object of the present invention to decrease number of accesses across different rows to display memory during interpolation of source video image.

It is a further object of the present invention to decrease size of local memory required for interpolation.

These and other objects of the present invention are realized by a graphics controller chip comprising an interpolator, an encoder circuit, a decoder circuit and a local memory. The encoder circuit receives pixel data of a first scan line of a source video image and generates a compressed data set corresponding to the pixel data of the first scan line. The encoder may use differential pulse code modulation technique to generate the compressed data set. The local memory is coupled to the encoder circuit to receive and store the compressed data set. In the preferred embodiment, the pixel data set is compressed to half the number of bits compared to the number of bits in the pixel data of the source video image.

The decoder circuit retrieves compressed data set in local memory and decompresses the compressed data set to generate a decompressed pixel data. The interpolator receives the decompressed data and pixel data of a second scan line of the source video image, and interpolates the pixel data in the received decompressed data and the second scan line to generate a set of additional pixel data of the upscaled image of the source video image. The interpolator in the preferred embodiment may be a polyphase interpolator.

In the preferred embodiment, the encoder further comprises a first adder to generate a quantizer input from pixel data of the source video pixel data and a predicted value. A quantizer generates the compressed data by quantizing the quantizer input. A recoverer circuit generates a recoverer value from the compressed data. A second adder adds the output of the recoverer with the predicted value, and a linear predictor generates the predicted value as a function of the output of the second adder. The linear predictor of the preferred embodiment comprises a set of flip-flops each for storing a bit of the output of the adder.

Interpolator, encoder circuit, decoder circuit and local memory of the graphics controller of the present invention are provided in a motion video architecture (MVA) block processing a source video image. A video controller block receives graphics/text data in parallel and generates graphics pixels corresponding to the received graphics/text data. A multiplexor receives pixel data from the video controller and MVA block and selects one of the two inputs depending on whether the corresponding pixel on display unit of the computer system is displaying video image or text/graphics image.

Another aspect of the present invention includes a method of upscaling a source video image in a graphics controller chip. The method includes the steps of receiving a first scan line of the source video image and storing the pixel data in a compressed format in a local memory.

The method of the present invention also includes the steps of retrieving the compressed data from the memory circuit and decompressing the compressed data to generate the pixel data. Pixels in the decompressed data and the second scan line are interpolated to generate a set of additional pixels of the upscaled image of the source video image.

The method of the present invention uses a differential pulse code modulating (DPCM) technique to compress the source video image. As a result, the compressed data stored in local memory comprises one half the number of bits compared to number of bits in the pixel data of the first scan line in the source video image.

DETAILED DESCRIPTION OF THE INVENTION

Figure 2:
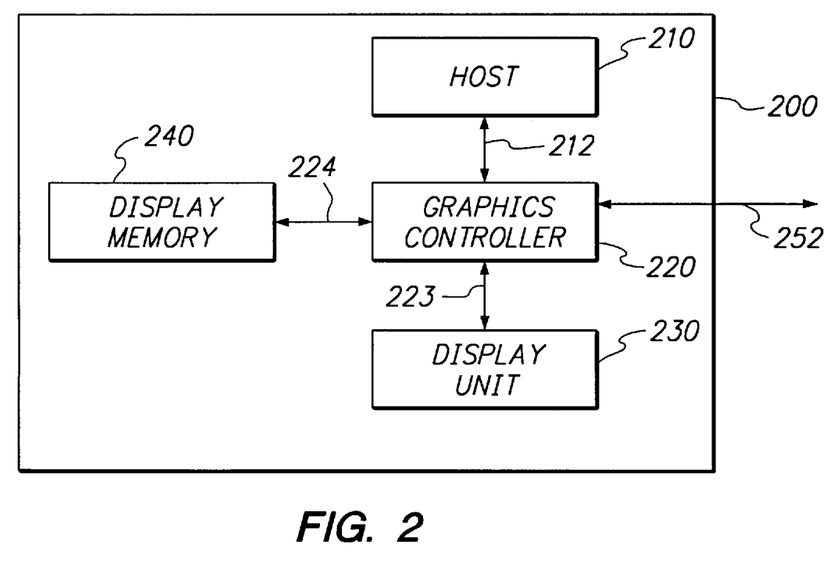
FIG. 2 is a block diagram of a computer system of the present invention comprising a host, a display memory, a graphics controller chip and a display unit.

FIG. 2 is a block diagram of a computer system 200 of the present invention. Computer System 200 comprises a Host 210, a Graphics Controller 220, a Display memory 240 and a Display Unit 230. Display memory 240 may be integrated with Graphics Controller 220 as one unit.

Graphics Controller 220 may receive video data of a source video image from an external device such as a video decoder (not shown in figures) over video path 252 or from Host 210, and stores the received video data in Display memory 240. Graphics Controller 220 of the present invention may then retrieve scan line data from Display memory 240, store the scan line data required for interpolation in a local memory in a compressed format, and decompress data corresponding to each pixel required for interpolation. By storing pixel data in compressed format, Graphics Controller 220 minimizes amount of local memory required for storing scan line data prior to interpolation.

Host 210 may comprise a processor (not shown in figure) and a main memory (not shown in figure). Host 210 may send graphics/text/video data over System Bus 212 to Graphics Controller 220. System Bus 212 may comprise, for example, a PCI bus. Graphics data may be received in a RGB 565 format. It will however be appreciated that the graphics data may be in any other format or with different number of bits of representation without departing from scope and spirit of the present invention.

Graphics Controller 220 may receive graphics/text/video data over System Bus 212 and store in Display memory 240 the graphics/text/video data along with any video data received over video path 252. Video data may comprise a television signal or any video image encoded in RGB format or YUV format or any other format for encoding video image. For example, the video data can be pixel data corresponding to a full motion video architecture (TM) (MVA) image. Graphics Controller 220 may then display the display data comprising all of video data, text data and graphics data on Display Unit 230.

Display memory 240 stores display data comprising video and graphics/text data before the display data is displayed on Display Unit 230. Display memory 240 may comprise a random access memory (e.g., DRAM, SRAM or the like). Display memory 240 may also be known as a video memory or VMEM in the graphic controller arts. However, due to the advent of Motion Video displays in computer systems, the term "video memory" may be a misnomer. Thus, for the purposes of this application, such a memory will be referred to as a display memory.

Figure 3:
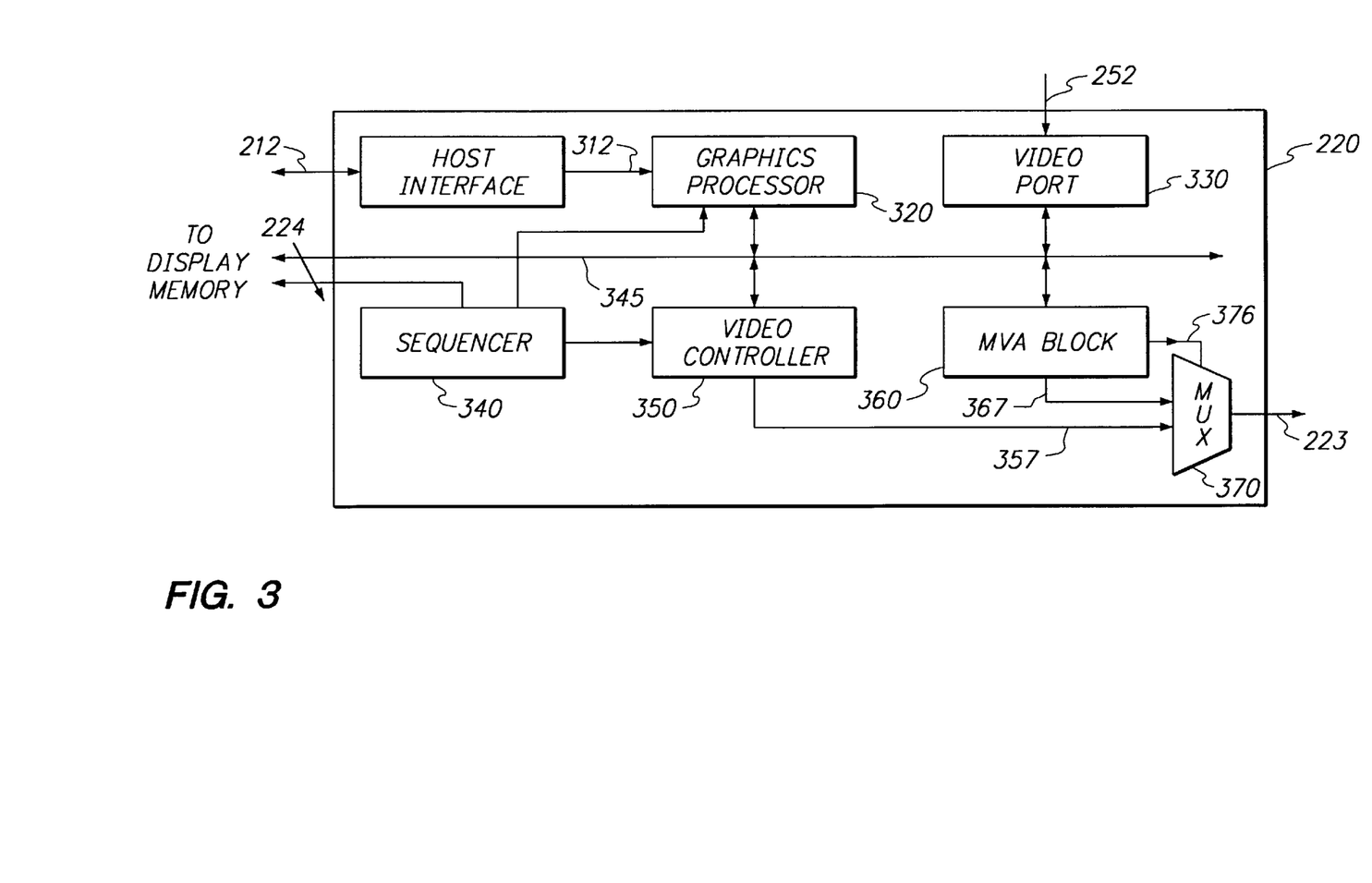
FIG. 3 is a block diagram of the graphics controller of the present invention including a MVA block where upscaling is performed.

Motion Video Architecture (TM) (MVA) block 360 may receive video data over bus 345, and upscale the video data by manipulating the source video data received. MVA Block 360 interpolates the pixel data in the source video data to achieve such upscaling/downsizing. Pixel data in source video data are stored in a compressed format using differential pulse code modulation (DPCM) prior to interpolation. Such storing in compressed format minimizes the amount of local memory required for storing the pixels of the source video data. MVA Block 360 sends the pixel data corresponding to the upscaled video image to Multiplexor 370 over a second mux input line 367.

Multiplexor 370 accepts as inputs RGB bits corresponding to graphics/text data and video data on mux input lines 367 and 357 respectively, and selects as output one of the two inputs under the control of mux select signal 376 asserted by MVA Block 360. If the display on display unit 230 at present screen refresh time corresponds to video data, mux select signal 376 is asserted so as to select video data on mux input line 367. On the other hand, if the display on the display unit 230 corresponds to graphics/text data sent by Host 210, mux select signal 376 is asserted so as to select the graphics/text data on mux input line 357.

Sequencer 340 provides timing control to Video Controller 350, Graphics Processor 320, and Display memory 240. The timing control may include various dot (pixel) clocks and horizontal count resolution.

Figure 4:
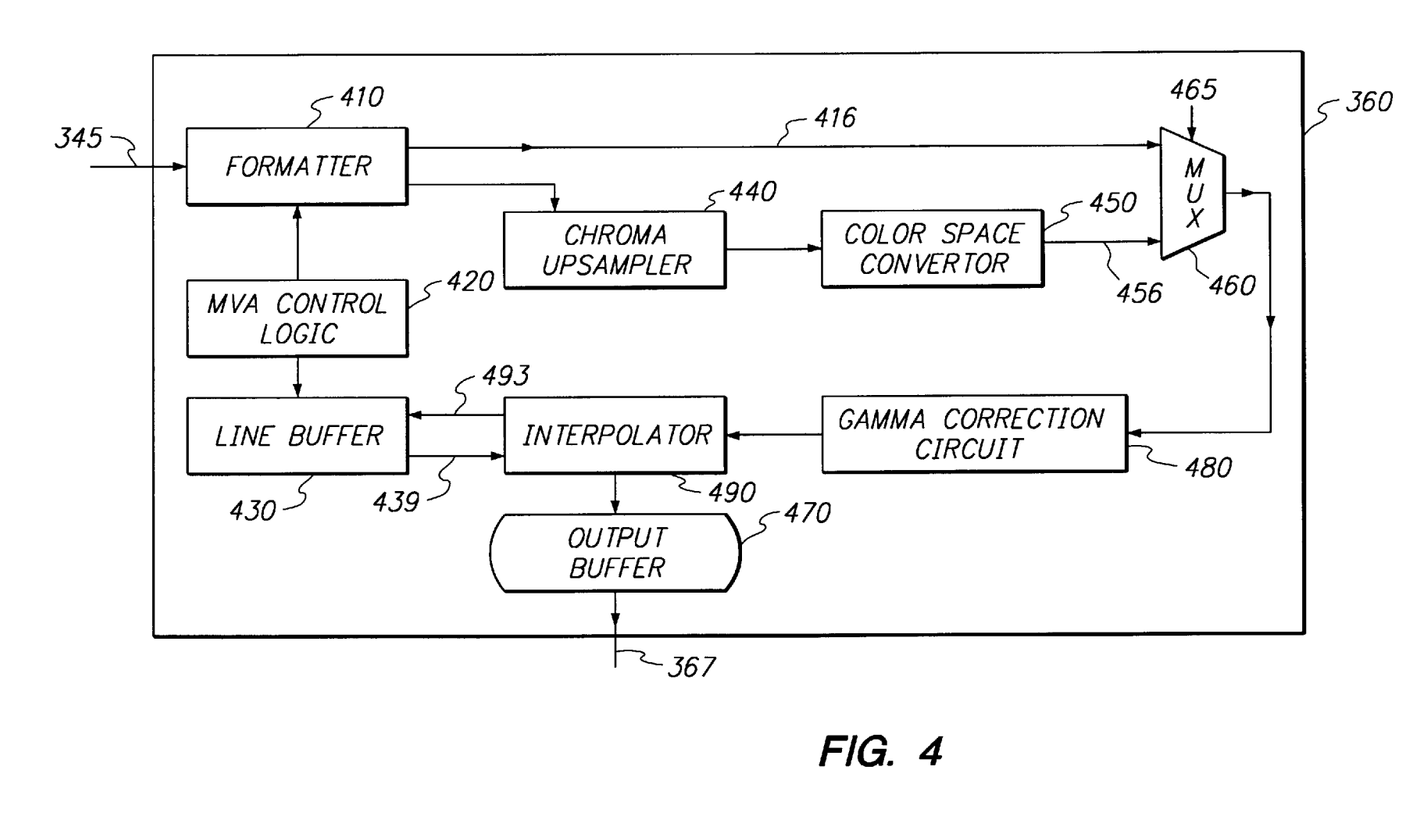
FIG. 4 is a block diagram of the MVA Block with an interpolator receiving pixels of previous scan lines from a line buffer storing the corresponding pixel data in a compressed format.

FIG. 4 is a block diagram of MVA Block 360 of the present invention. MVA Block 360 comprises Formatter 410, Chroma Upscaler 440, Color Space Converter 450, MVA Control Logic 420, Line Buffer 430, YUV-RGB Select Multiplexor 460, interpolator 490, Gamma Correction Circuit 480, and Output Buffer 470.

Line Buffer 430 receives pixel data of a current scan line in an RGB 888 format, stores received pixel data in a compressed format and then decompresses the compressed data to provide Interpolator 490 the video pixel data in the original RGB 888 format. Interpolator 490 may use such video pixel data for interpolation in conjunction along with a subsequent scan line. Since Output Buffer 470 stores video pixel data in a compressed format, the amount of memory required on MVA Block 360 is reduced.

Formatter 410 receives source video image pixel data from Display memory 240 over bus 345. Received video data may be in any format such as RGB 555 format or RGB 888 or YUV 422. Formatter 410 converts RGB 555 or 565 data into 888 format, and sends converted data over a 24-bit bus 416. Formatter 410 therefore converts received pixel data into expected pixel format. If source video data is in YUV format, Formatter 410 sends YUV signals over a bus 414.

Chroma Upsampler 440 upsamples the chroma component of the YUV signal to compensate for potential down-sampling of the chroma signals while transmitting the source video signal to the computer system. Such down-sampling is typically done while scanning a television signal to take advantage of low spacial resolution for chroma compared to luminance in the human eye. Color Space Converter 450 converts the input YUV signal to RGB 888 format before sending such RGB 888 format data over 24-bit bus 456.

YUV-RGB Select Multiplexor 460 receives as input source video data in RGB 888 format on input lines 416 or 456 depending on whether source video data is in RGB or YUV formats respectively. YUV-RGB Select Multiplexor 460 selects one of the two inputs under control of input YUV-RGB Select Signal 465, which is typically driven from a bit in a register programmed by user. Gamma Correction Circuit 480 removes gamma from video signal and is conventional in the art.

Interpolator 490 receives pixel data of scan lines from Gamma Correction Circuit 480 and interpolates the received pixels to upscale the source video data. Interpolator 490 performs horizontal interpolation corresponding to source video scan lines as the corresponding pixel data is received from Gamma Correction Circuit 480. Since the scan lines are scanned in a horizontal manner, horizontal upscaling may not require extensive buffering as in vertical interpolation.

To perform vertical interpolation, Interpolator 490 stores pixel data of previous scan lines in Line Buffer 430 and uses pixel data of the previous scan lines for vertical upscaling. In other words, Interpolator 490 receives present scan line data from Gamma Correction Circuit 480, and uses previous scan line data stored in Line Buffer 430. Present scan line data may then be stored in Line Buffer 430 and becomes previous scan line data for subsequently received scan lines from Gamma Correction Circuit 480. It will be appreciated Interpolator 490 may store multiple scan lines in Line Buffer 430 without departing from scope and spirit of the present invention.

As a horizontal scan line is generated, the corresponding pixel data (including interpolated pixels) are stored in Output Buffer 470 which is then available as input to Multiplexor 370 on signal line 367. The horizontal scan lines may be generated as a result of both vertical and horizontal interpolation.

Line Buffer 430 receives scan line data from Interpolator 490 and stores the scan line data in compressed format using differential pulse code modulation (DPCM) format. Line Buffer 430 may store data corresponding to multiple scan lines depending on the number of scan lines required for vertical interpolation. However, in the preferred embodiment only one scan line is typically stored. It is therefore within the scope and spirit of the present invention to store pixel data for multiple scan lines in Line Buffer 430.

Figure 5:
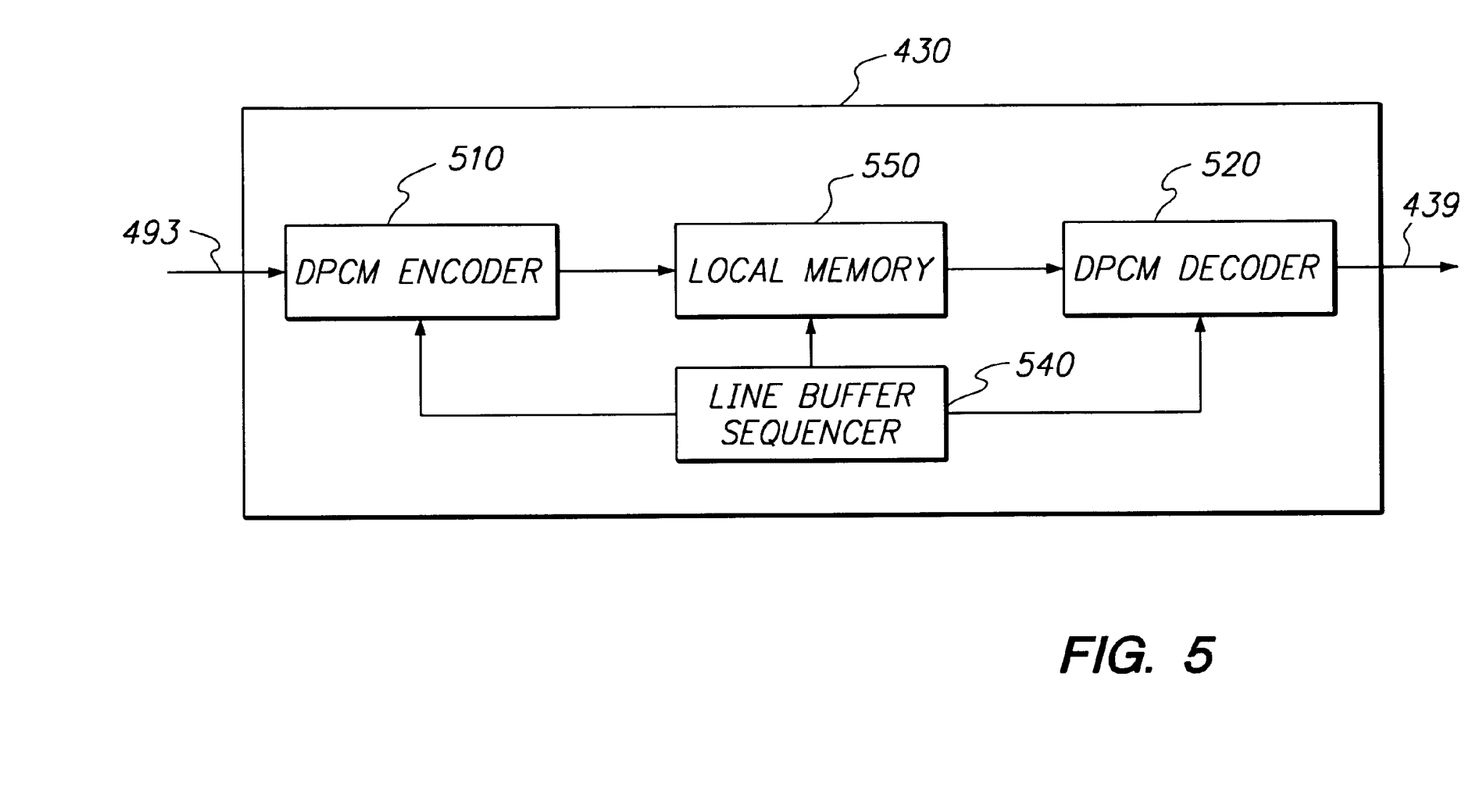
FIG. 5 is a block diagram of the line buffer comprising a DPCM encoder, a local memory and a DPCM decoder.

FIG. 5 illustrates a block diagram of Line Buffer 430 of the present invention. Line Buffer 430 comprises DPCM Decoder 520, DPCM Encoder 510, Local Memory 550, and Line Buffer Sequencer 540 for each of the RGB components of each pixel. In the interest of conciseness, the circuitry required for only one of the three colors in shown and explained. However, Buffer Sequencer 540 may be shared by circuitry for all the three colors.

DPCM Encoder 510 receives source video data from Interpolator 490, compresses the corresponding pixel data using DPCM, and stores compressed DPCM data in Local Memory 550. Since there is generally a high correlation between adjacent pixel data values in video data (ex. television signals), the source video data lends to application of DPCM to compress the pixel data.

DPCM Encoder 510 compresses the 24-bit RGB data into 12 bits in the preferred embodiment. It will however be apparent to one of ordinary skill in the art that Line Buffer 430 may be designed using a different compression technique or a different number of bits without departing from scope and spirit of the present invention.

DPCM Decoder 520 retrieves compressed DPCM data (i.e. 12 bits per pixel) from Local Memory 550, decompresses the DPCM data to provide Interpolator 490 in the original RGB 888 format. Buffer Sequencer 540 coordinates and controls the operations of DPCM Encoder 510, and DPCM Decoder 520.

Local Memory 550 is designed to store at least 768 pixels to accommodate Square Pixel PAL format, which is believed to be the maximum number of pixels per scan line in the standard industry scanning formats. Local Memory 550 may comprise an SRAM unit for faster access.

In the preferred embodiment of Local Memory 550, pixel data for only one scan line is stored. Therefore, Local Memory 550 of the preferred embodiment comprises 768× 12 bits. However, a different number of bits may be required to support storing of more scan lines or more pixels per scan line.

It will be appreciated that the amount of memory required is reduced to half by compressing the source pixel data into half using DPCM. However, additional circuitry to support compression (encoder) and decompression (decoder) is required to support the reduced memory requirement.

Figure 6:
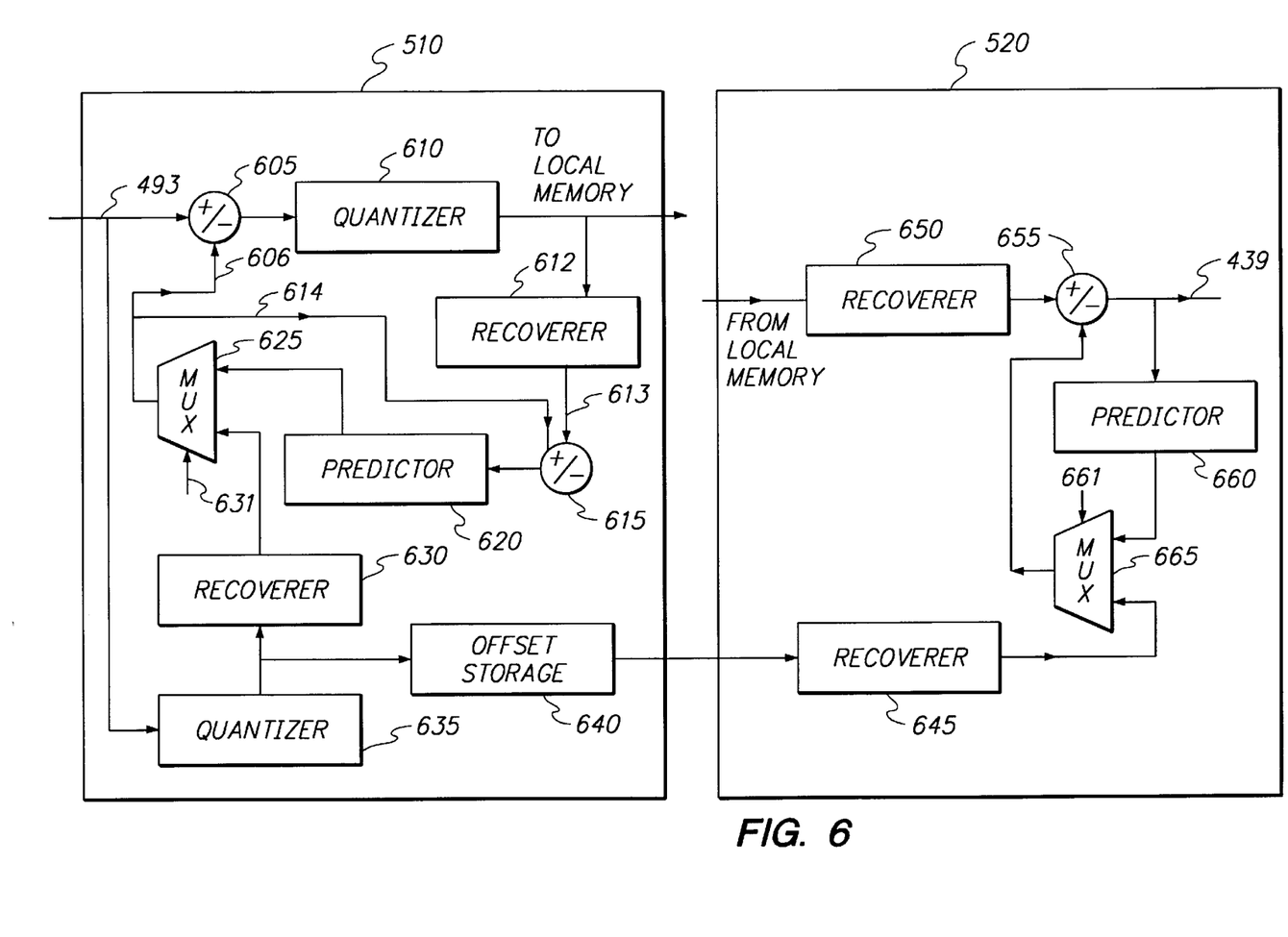
FIG. 6 is a detailed block diagram of DPCM encoder and DPCM decoder.

FIG. 6 is a more detailed block diagram illustrating the operation of DPCM Encoder 510 and DPCM Decoder 520 in the preferred embodiment of the present invention. Adders 605 and 615, Recoverer 612, and Quantizer 610 in DPCM Encoder 510 together generate DPCM data stored in Local Memory 550. On the other hand, Recoverer 650, Adder 655, and Predictor 660 together decode the DPCM data to generate pixel data in the RGB format.

Multiplexors 625 and 665, Recoverer 630 and 645, Quantizer 635, and Offset Storage 640 together are designed to prevent a slope overload condition while processing a first pixel in a scan line. Such special circuitry may be required to handle first pixel in a scan line as pixels prior to a first pixel on a scan line may not exist, and corresponding pixel data value may be undefined. When such prior pixel is non-existent, predictor 620 may generate an indeterminate value for a predicted value. As the predicted value may be undeterminable, the difference of predicted value and first pixel data may not fit within quantization aperture of Quantizer 610, thereby resulting in a slope overload condition.

Adder 605 receives pixel data of source video (eight bits of one of the RGB components) on line 493 and a predicted value on line 606, and subtracts predicted value from the pixel data. Adder 605 may further comprise a clamp circuit to clamp the result of subtraction to within a predetermined range. Such range may be varied by means of a value stored in a register. In a preferred embodiment, two ranges {−128 to +127} and {−256 to +255} may be supported.

Quantizer 610 receives output (eight bits) of Adder 605 and quantizes the received value into a four bit output. Quantizer 610 may be conventional in the art and may be either linear or non-linear. In the case of a linear quantizer, Quantizer 610 may comprise a shift circuit logic to capture the least significant four bits. In a preferred embodiment, a switched non-linear quantizer may be used as is well-known in the art. The resulting four bits may be stored in Local Memory 550.

Recoverer 612 accepts as input the quantized four bits and generates an output of eight bits recovered value. In a preferred embodiment, a non-linear recoverer may be employed as is well known in the art. Adder 615 adds the predicted value received on line 614 and output of Recoverer 612.

Predictor 620 receives the output of Adder 615 and predicts a next pixel value. In the preferred embodiment, Predictor 620 may comprise a linear predictor including a set of flip-flops with each flip-flop storing a bit of the output of Adder 615. Higher order predictors making use of outputs of multiple prior iterations may be employed and are conventional in the art.

Multiplexor 625 along with Recoverer 630 and Quantizer 635 serves to override output of Predictor 620 when a first pixel of a scan line is received on line 493. Such a overriding function is necessary because pixel prior to first pixel may be non-existent, and Predictor 620 may have predicted a undefined value. As a result of such undefined predicted value, in the absence of Multiplexor 625, the output of Adder 605 may be larger than aperture (i.e. range represented by four bits) of Quantizer 610, thereby leading to a slope-overload condition shown in FIG. 7.

Figure 7:
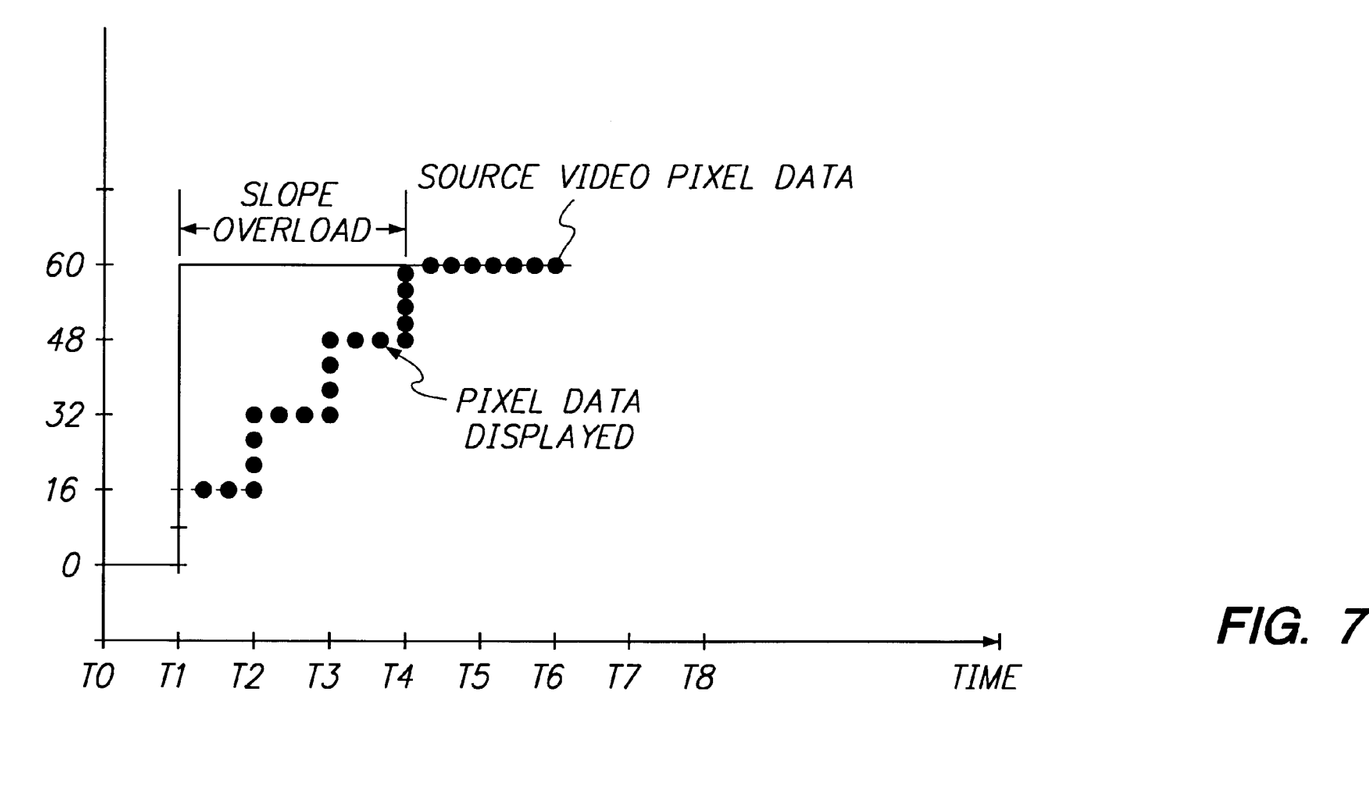
FIG. 7 is a graph-illustrating slope overload condition in DPCM encoding.

Referring to FIG. 7, during time period T0–T1, the source video pixel data is shown with a value of 0 possibly because of processing pixels corresponding to blanking interval. At time T1, the source video pixel data increases to 60. Assuming a four bit quantization output (and a resulting aperture of 16), the DPCM output can only increase by 16 during each period. Hence, the output displayed has a pixel data value of 16 during T1–T2, 32 during T2–T3, and 48 during T3–T4. Eventually at time T4, the pixel data displayed is equal to source pixel data.

A slope overload condition is said to be present during the period T1–T4 when the pixel data displayed is not equal to source video pixel data as a result of quantization aperture not being greater than or equal to the change in input signal value. Hence in the absence of the overriding circuit, a slope overload condition may be present while displaying a video signal. The slope overload condition leads to a display wherein the edges are blurred but gradually brightening as the display is observed towards the center. The override circuitry of FIG. 6 operates to prevent such blurring at the left hand edge of video display.

Referring to FIG. 6 again, Quantizer 635 typically quantizes first pixel data to generate a four bit data value. In a preferred embodiment, Quantizer 635 may comprise a non-linear quantizer well known in the art. If a linear quantizer is implemented, quantized value may comprise most significant four bits of the first pixel of a scan line. Recoverer 630 may generate a recoverer value comprising eight bits from the quantized value to generate a predicted value as a function of first pixel data. Hence, in effect, Quantizer 635 and Recoverer 630 operate to generate a predicted value as a function of first pixel data of a scan line.

Multiplexor 625 receives as inputs output of Predictor 620 and output of Recoverer 630, and selects one of the two inputs under control of first pixel select line 631. First pixel select line 631 causes Multiplexor 625 to normally select as output the output Predictor 620, but causes to select output of Recoverer 630 when the pixel processed is a first pixel of the scan line.

Therefore, when first pixel data of a scan line is processed, predicted value which is a function of first pixel data is passed on line 606 as input to Adder 605. As the other input of Adder 605 is the first pixel data itself, the result of subtraction may fit within aperture of Quantizer 610. Hence, the input to Quantizer 610 is within aperture of Quantizer 610 and a slope overload condition is avoided.

Offset Storage 640, Recoverer 645, and Multiplexor 665 operate to coordinate the override function in the DPCM Decoder 520. Offset Storage 640 stores the four bit quantized value generated by Quantizer 635. Recoverer 645 generates eight bits from the quantized value stored in Offset Storage 640.

Multiplexor 665 operates to select as output an input from Recoverer 645 while processing first pixel of a scan line, and input from Predictor 660 while processing subsequent pixels within a scan line. Therefore, the override function is coordinated in both DPCM Encoder 510 and DPCM Decoder 520.

Recoverer 650 retrieves compressed pixel data (four bits per pixels) from Local Memory 550, and generates an eight bit recovery value as output. Recoverer 650 generates an eight bit recoverer value from compressed four bits similar to Recoverer 612.

Adder 655 adds the recovered value received from Recoverer 650 and the predicted value received from Multiplexor 665 to generate the pixel data value for use by Interpolator 490.

Predictor 660 receives the output of Adder 655 to generate a predicted value for the next pixel. Predictor 660 operates analogous to Predictor 620, and in the preferred embodiment may comprise a set of flip-flops to store a bit of the output of Adder 655, which is the predicted value.

Hence, DPCM Encoder 510 generates a DPCM code of the source video pixel data and the DPCM Decoder 520 decodes the DPCM code to generate pixel data values for interpolator 490. DPCM Encoder 510 and DPCM Decoder 520 together further include a override circuitry to avoid slope overload condition while processing a first pixel of a scan line. It will be further appreciated that the override circuitry may also be used in any slope overload situations including while processing pixels in other edges.

The operation of DPCM Encoder 510 and DPCM Decoder 520 is further illustrated with reference to an example. For the purpose of this example, linear quantizers are assumed. Assume that the first two pixels on a scan line are B4 and B9 respectively. Assume also that Predictor 620 has predicted a value of 0 for the first pixel.

To process first pixel data B4, Quantizer 635 generates four bits representing "B" which is stored in Offset Storage 640. Recoverer 630 generates a recoverer value of B0 by padding four zeroes into the least significant bit positions. Mux select signal line 631 is asserted to select B0 from Recoverer 630 in stead of 00 from Predictor 620.

Adder 605 subtracts B0 received from Multiplexor 625 from the first pixel value B4 to generate 04, which is fed to Quantizer 610. Linear Quantizer 610 generates four bits representing 4, which is stored in Local Memory 550.

Recoverer 612 receives four bits representing 4, and generates eight bits representing 04. Adder 615 adds B0 (i.e. output of Multiplexor 625) and 04 (output of Recoverer 612) to generate B4. Since Predictor 620 of first order is assumed, Predictor 620 stores B4 as predicted value for the next pixel which is provided to Adder 605 through Multiplexor 625.

On the DPCM Decoder 520 side, Recoverer 650 receives four bits representing 4 from Local Memory 550, and generates eight bits representing 04. In parallel, Recoverer 645 retrieves four bits with value B from Offset Storage 640, and generates eight bits representing B0. Since B0 corresponds to the first pixel, Multiplexor 665 selects as output the B0 value stored in Recoverer 645.

Adder 655 adds B0 (output of Multiplexor 665) to 04 (value received from Recoverer 650) to generate B4—the pixel value sent to Interpolator 490. The value B4 is stored as predicted value in Predictor 660.

To process second pixel B9, Adder 605 subtracts predicted value B4 (generated while processing first pixel) from B9 to generate eight bits representing 05. Quantizer 610 quantizes the eight bits to (assuming a linear quantizer) four bits representing 5, which is stored in Local Memory 550.

Recoverer 650 of DPCM Decoder 520 receives four bits representing 5, and generates eight bits representing 05. Adder 655 adds the predicted value B4 to 05 to generate the pixel data value B9 sent to Interpolator 490.

Therefore, Graphics Controller 220 of the present invention decreases the number of successive accesses to different rows by retrieving the whole scan line and storing the corresponding pixels in a memory. Also, Graphics Controller 220 minimizes the size of local memory required to store scan lines for interpolation by having DPCM Encoder 510 store the pixels in a compressed format. In addition, Graphics Controller 220 provides a override circuitry to avoid slope overload condition while compressing first pixel data.

Although the present invention has been illustrated and described in detail, it is clearly understood that the same is by way of illustration and example only and is not to be taken by way of limitation, the scope and spirit of the present invention being limited only the terms of the appended claims.

What is claimed is:

1. A graphics controller integrated circuit for upscaling a source video image to generate an upscaled video image, the source video image being transmitted by a processing unit comprising a plurality of uncompressed scan lines with each scan line comprising a set of pixel data, the graphics controller integrated circuit comprising:

an encoder circuit integrated into the graphics controller integrated circuit for receiving a set of uncompressed pixel data for a first scan line of the source video image from the processing unit and generating a compressed data set corresponding to the set of pixel data for the first scan line;

a local memory coupled to receive and store the compressed data set;

a decoder circuit integrated into the graphics controller integrated circuit for retrieving the compressed data set in the local memory and for decompressing the compressed data set to generate a decompressed pixel data set; and an interpolator integrated into the graphics controller integrated circuit for receiving the decompressed pixel data set and a set of pixel data for a second scan line of the source video, the interpolator interpolating the decompressed pixel data set and the set of pixel data for the second scan line to generate a set of additional pixel data comprised in the upscaled video image.

2. The graphics controller integrated circuit of claim 1 wherein a display memory is provided for storing the set of uncompressed pixel data for the first scan line and the set of uncompressed pixel data for the second scan line prior to being received by the encoder circuit and the interpolator respectively.

3. The graphics controller integrated circuit of claim 1 wherein the decoder circuit comprises a DPCM decoder and the encoder circuit comprises a DPCM encoder.

4. The graphics controller integrated circuit of claim 3 wherein the DPCM encoder compresses the set of pixel data for the first scan line such that resulting compressed data set comprises half the number bits compared to the number of bits in the set of pixel data for the first scan line.

5. The graphics controller integrated circuit of claim 3 wherein the interpolator comprises a polyphase interpolator.

6. The graphics controller integrated circuit of claim 3 wherein the DPCM encoder comprises a first adder for receiving uncompressed pixel data and a predicted value, the first adder generating a difference of the uncompressed pixel data and the predicted value;

a quantizer for generating the compressed data set by quantizing the difference;

a recoverer for generating a recoverer value from the compressed data set;

a second adder for adding the recoverer value with the predicted value to generate an output; and a predictor for generating the predicted value as a function of the output of the second adder.

7. The graphics controller integrated circuit of claim 6 wherein the predictor comprises a set of flip-flops each for storing a bit of the output of the second adder.

8. The graphics controller integrated circuit of claim 6 further comprising a override circuit to avoid a overload condition in DPCM decoding and encoding.

9. The graphics controller integrated circuit of claim 8 wherein the override avoids the overload condition by changing a predicted value to correspond to a present pixel data value.

10. The graphics controller integrated circuit of claim 8 further comprising a video motion block wherein the video motion block comprises the DPCM encoder, the DPCM decoder, the override and the local memory.

11. The graphics controller integrated circuit of claim 10 further comprising
   a video controller for sending a set of graphics pixels; and
   a multiplexor for receiving the graphics pixels and pixel data of the upscaled video image, and for selectively sending to a display unit one of the graphics pixels and pixel data of the upscaled video image.

12. The graphics controller integrated circuit of claim 11 wherein the encoder circuit receives pixel data of the first scan line from a display memory.

13. A computer system for displaying a source video image on a display unit, said source video image comprising a plurality of uncompressed scan lines with each scan line comprising a set of pixel data, said computer system comprising:
   a processing unit for transmitting the source video image comprising a plurality of uncompressed scan lines;
   a display memory for storing graphics data;
   a display unit; and
   a graphics controller integrated circuit receiving the uncompressed pixel data of said source video image from the processing unit and said graphics data, and upscaling said source video image to generate an upscaled video image prior to displaying said graphics and said upscaled source video image on said display unit, said graphics controller circuit comprising:
   an encoder circuit integrated into the graphics controller integrated circuit for receiving a set of uncompressed pixel data for a first scan line of the source video image and generating a compressed data set corresponding to the set of pixel data for the first scan line;
   a local memory coupled to receive and store the compressed data set;
   a decoder circuit integrated into the graphics controller integrated circuit for retrieving the compressed data set in the local memory and for decompressing the compressed data set to generate a decompressed pixel data set; and
   an interpolator integrated into the graphics controller integrated circuit for receiving the decompressed pixel data set and a set of pixel data for a second scan line of the source video, the interpolator interpolating the decompressed pixel data set and the set of pixel data for the second scan line to generate a set of additional pixel data comprised in the upscaled video image.

14. The computer system of claim 13 wherein the display memory stores the set of pixel data for the first scan line and the set of pixel data for the second scan line.

15. The computer system of claim 13 wherein the decoder circuit comprises a DPCM decoder and the encoder circuit comprises a DPCM encoder.

16. The computer system of claim 15 wherein the DPCM encoder compresses the set of pixel data for the first scan line such that resulting compressed data set comprises half the number bits compared to the number of bits in the set of pixel data for the first scan line.

17. The computer system of claim 15 wherein the interpolator comprises a polyphase interpolator.

18. The computer system of claim 15 where in the DPCM encoder comprises:
   a first adder for receiving pixel data and a predicted value, the first adder generating a difference of the pixel data and the predicted value;
   a quantizer for generating the compressed data set by quantizing the difference;
   a recoverer for generating a recoverer value from the compressed data set;
   a second adder for adding the recoverer value with the predicted value to generate an output; and
   a predictor for generating the predicted value as a function of the output of the second adder.

19. The computer system of claim 18 wherein the predictor comprises a set of flip-flops each for storing a bit of the output of the second adder.

20. The computer system of claim 18 further comprising a override to avoid a overload condition in DPCM decoding and encoding.

21. The computer system of claim 20 wherein the override avoids the overload condition by changing a predicted value to correspond to a present pixel data value.

22. The computer system of claim 20 further comprising a video motion block wherein the video motion block comprises the DPCM encoder, the DPCM decoder, the override and the local memory.

23. The computer system of claim 22 further comprising
   a video controller for sending a set of graphics pixels; and
   a multiplexor for receiving the graphics pixels and pixel data of the upscaled video image, and for selectively sending to a display unit one of the graphics pixels and pixel data of the upscaled video image.

24. A method of upscaling a source video image in a graphics controller integrated circuit, said source video image being transmitted by a processing unit comprising a plurality of uncompressed scan lines with each scan line comprising a set of pixel data, said method comprising the steps of
   receiving a first uncompressed scan line of said source video image in an encoder circuit integrated into the graphics controller integrated circuit;
   compressing the pixel data corresponding to said first scan line to generate a compressed data;
   storing said compressed data in a local memory;
   receiving a second scan line of said source video image;
   retrieving said compressed data from the local memory into a decoder circuit integrated into the graphics controller integrated circuit;
   decompressing said compressed data to generate said pixel data;
   generating a set of additional pixels by interpolating pixels in said first scan line and said second scan line from an interpolator integrated into the graphics controller integrated circuit wherein said additional pixels are comprised in an upscaled image of said source video image.

25. The method of claim 24 wherein said step of compressing comprises the step of using differential pulse code modulating (DPCM).

26. The method of claim 25 further comprising the steps of storing said uncompressed source video image in a display memory wherein said step of receiving receives said first uncompressed scan line from said display memory.

27. The method of claim 26 wherein said step of using DPCM generates said compressed data comprising one half the number of bits compared to number of bits in the pixel data of said uncompressed first scan line in the source video image.

28. A graphics controller integrated circuit for displaying a source video image on a display unit, said source video image being transmitted by a processing unit comprising a plurality of uncompressed scan lines with each scan line comprising a set of pixel data, said graphics controller integrated circuit comprising:

- a DPCM encoder circuit integrated into the graphics controller integrated circuit for receiving a set of uncompressed pixel data for a first scan line of said source video image from the processing unit and generating a compressed data set using a DPCM encoding scheme corresponding to the set of pixel data of the first scan line;
- a local memory coupled to receive and store the compressed data set;
- a DPCM decoder circuit integrated into the graphics controller integrated circuit for retrieving said compressed data set in said local memory and for decompressing said compressed data set to generate a decompressed pixel data set;
- an interpolator integrated into the graphics controller integrated circuit for receiving said decompressed pixel data set and a set of pixel data for a second scan line of said source video, said interpolator interpolating the decompressed pixel data set and the set of pixel data for the second scan line to generate a set of additional pixel data comprised in an upscaled image;
- a video controller for receiving a graphics data from a host, and generating a corresponding pixel data; and
- a multiplexor for selectively forwarding to said display unit either pixel data corresponding to said graphics data or pixel data of said upscaled image.

* * * * *